United States Patent
Stoppe et al.

(10) Patent No.: US 10,475,168 B2
(45) Date of Patent: Nov. 12, 2019

(54) METHOD FOR GENERATING A RESULT IMAGE AND OPTICAL DEVICE

(71) Applicant: Carl Zeiss Microscopy GmbH, Jena (DE)

(72) Inventors: Lars Stoppe, Jena (DE); Christoph Husemann, Jena (DE); Wolfgang Singer, Aalen (DE)

(73) Assignee: Carl Zeiss Microscopy GmbH, Jena (DE)

( * ) Notice: Subject to any disclaimer, the term of this patent is extended or adjusted under 35 U.S.C. 154(b) by 2 days.

(21) Appl. No.: 15/508,830

(22) PCT Filed: Sep. 15, 2015

(86) PCT No.: PCT/EP2015/071064
§ 371 (c)(1),
(2) Date: Mar. 3, 2017

(87) PCT Pub. No.: WO2016/041944
PCT Pub. Date: Mar. 24, 2016

(65) Prior Publication Data
US 2017/0262968 A1   Sep. 14, 2017

(30) Foreign Application Priority Data

Sep. 15, 2014   (DE) .......................... 10 2014 113 258

(51) Int. Cl.
*G06T 5/00* (2006.01)
*G06T 5/50* (2006.01)
(Continued)

(52) U.S. Cl.
CPC .............. *G06T 5/007* (2013.01); *G06T 5/003* (2013.01); *G06T 5/50* (2013.01); *G06T 3/4076* (2013.01);
(Continued)

(58) Field of Classification Search
None
See application file for complete search history.

(56) References Cited

U.S. PATENT DOCUMENTS

| 6,088,612 A | 7/2000 | Blair |
| 2004/0184667 A1* | 9/2004 | Raskar ...................... G06T 5/50 382/254 |

(Continued)

FOREIGN PATENT DOCUMENTS

| DE | 102004026630 A1 | 12/2005 |
| JP | 2004288185 A | 10/2004 |

(Continued)

OTHER PUBLICATIONS

Rosenbluth, Alan E. et al., "Optimum mask and source patterns to print a given shape", 2002 Society of Photo-Optical Instrumentation Engineers, 2002, pp. 13-30.

(Continued)

*Primary Examiner* — Delomia L Gilliard
(74) *Attorney, Agent, or Firm* — Murphy, Bilak & Homiller, PLLC

(57) ABSTRACT

An object is illuminated sequentially using at least two illumination geometries. An intensity image of the object is captured for each one of the at least two illumination geometries. The intensity images are combined for producing a results image. Combining is carried out in such a way that the results image satisfies a predetermined optimization criterion. By way of example, the optimization criterion may relate to an image contrast, an edge steepness or an image sharpness. Optimization may be carried out with a spatial resolution.

20 Claims, 8 Drawing Sheets

(51) Int. Cl.
*G06T 3/40* (2006.01)
*G06T 5/30* (2006.01)

(52) U.S. Cl.
CPC ............. *G06T 5/002* (2013.01); *G06T 5/006* (2013.01); *G06T 5/30* (2013.01); *G06T 2207/10056* (2013.01); *G06T 2207/10152* (2013.01); *G06T 2207/20221* (2013.01)

(56) References Cited

U.S. PATENT DOCUMENTS

| | | | |
|---|---|---|---|
| 2009/0119808 A1 | 5/2009 | Giakos | |
| 2010/0128964 A1* | 5/2010 | Blair | G06K 9/2018 382/135 |
| 2012/0314103 A1* | 12/2012 | Majewicz | H04N 5/2354 348/239 |
| 2014/0002722 A1 | 1/2014 | Cook et al. | |
| 2014/0126835 A1* | 5/2014 | Shioya | G06T 5/008 382/274 |

FOREIGN PATENT DOCUMENTS

| | | | |
|---|---|---|---|
| JP | 2008299505 A | 12/2008 | |
| JP | WO 2014002722 A1 * | 1/2014 | ........... H01L 33/504 |
| JP | 2014096000 A | 5/2014 | |
| WO | 03087326 A2 | 10/2003 | |

OTHER PUBLICATIONS

Schellenberg, Frank, "A Little Light Magic", IEEE Spectrum, Sep. 2003, pp. 34-39.
Schellenberg, Franklin M., "A History of Resolution Enhancement Technology", Optical Review vol. 12, No. 2, 2005, pp. 83-89.
Schellenberg, Franklin M., "Resolution Enhancement Technology: The Past, the Present, and Extensions for the Future", Proc. SPIE 5377, Optical Microlithography XVII, 1, May 28, 2004, pp. 1-20.
Siedentopf, H., "Die Sichtbarmachung von Kanten im mikroskipischen Bllde", Zeitschrift für Wissenschaftlich Mikroskopie und für Mikroskopische Technik, Band XXIV, Leipzig, 1907, pp. 424-431.
Hashimoto, Jun, et al., "Study of Image Processing Based Recognition of Ancient Coins Illuminated from Three Directions", FIT (Forum of Information Technology), 2002, 10 pages.
Schechner, Yoav Y, et al., "A Theory of Multiplexed Illumination", Proc. IEEE Int. Conf. Computer Vision, Nov. 2003, pp. 808-815.
Suzuki, Yusuke, et al., "Correction of Warping and Shade of Document Image Acquired by a Stereo Camera", ITE Technical Report, vol. 30, No. 42, Aug. 2006, pp. 15-18.

* cited by examiner

METHOD FOR GENERATING A RESULT IMAGE AND OPTICAL DEVICE

FIELD OF THE INVENTION

Exemplary embodiments of the invention relate to a method for producing a results image and a corresponding apparatus. In particular, exemplary embodiments relate to techniques which facilitate the provision of a results image of an object, which satisfies a predetermined optimization criterion.

BACKGROUND

Often, the provision of a results image which satisfies one or more optimization criteria may be desirable when imaging objects by means of an optical apparatus. In particular, such an optimization criterion may be an image contrast of the results image. It may be desirable to obtain an image contrast which is as high as possible. In the case of a comparatively high image contrast, it may be possible to obtain very different physical parameters and information about the object.

Techniques (structured illumination) which facilitate such an optimization of the results image by means of appropriate hardware of an illumination apparatus of the optical apparatus are known. By way of example, such techniques are described in H. Gross et al., "Handbook of Optical Systems", volume 2, Wiley-VCH, 2005. Here, it is possible to use, for example, structure filters in a pupil plane of the illumination apparatus. As a result, it may be possible to image the object, e.g., in particular, an amplitude object, with a particularly great information depth.

However, such techniques have certain restrictions or disadvantages. Since the selection of the structure filter typically depends on the object to be imaged, it may be necessary to receive the structure filter in an interchangeable manner in the illumination apparatus by means of a mask-interchange unit and possibly keep a plurality of different structure filters available. For different types of objects, such as e.g. biological samples or unknown non-biological samples, this may be disadvantageous since it is necessary to keep a relatively large number of structure filters available. What may then happen in practice is that the matching structure filter is not present. Further, a subsequent change of the structure filter after completed image capture (post-processing step) is not possible or only possible to a restricted extent. Typically, the complexity of the optical apparatus increases as a result of keeping additional hardware components available. A susceptibility to errors, for example on account of incorrect mechanical actuation, wear-and-tear or contamination, etc., may also be increased by the interchangeable availability of the structure filters.

SUMMARY

This is why there is a need for improved techniques for producing a results image which satisfies a predetermined optimization criterion, said techniques lifting at least some of the aforementioned disadvantages and restrictions. In particular, there is a need for those techniques which facilitate an accurate and flexible provision of the results image, which satisfies a respective optimization criterion.

In accordance with one aspect, the invention relates to a method for producing a results image of an object by means of an optical apparatus. The method comprises sequentially illuminating the object using at least two illumination geometries by means of an illumination apparatus of the optical apparatus. The method furthermore comprises, for each one of the at least two illumination geometries, capturing an intensity image of the object during illumination with the respective illumination geometry. The intensity image is captured by means of a detector of the optical apparatus. The method furthermore comprises combining the intensity images to produce the results image by means of a computing unit. Here, combining is carried out in such a way that the results image satisfies a predetermined optimization criterion.

By way of example, the object may be an amplitude object. That is to say, the amplitude object may cause an attenuation of the transmitted light, at least in part. Thus, the results image may image the object. By way of example, the results image may image the object in magnified fashion. By way of example, the optical apparatus may be a microscope. By way of example, objects may comprise technical objects, in particular for routine monitoring of identical components, but also biological objects. The intensity images may correspond to a partially coherent image of the object, for example in contrast to fluorescence imaging. To this extent, the intensity images may also be referred to as partially coherent images. Since the intensity images are combined to form the results image, the intensity images may also be referred to as partial images.

In general, the illumination geometry may be characterized by very different geometric parameters of the illumination of the object with light. In particular, the at least two illumination geometries may comprise different illumination directions. By way of example, at least one of the at least two illumination geometries could comprise more than one illumination direction; this means that a plurality of illumination directions are combined in relation to one illumination geometry. Particularly fast imaging may be carried out by combining illumination directions.

Alternatively, or additionally, the at least two illumination geometries may comprise different illumination solid angles. An illumination direction may illuminate the object, for example from a well-defined angle in relation to the optical axis. By contrast, an illumination geometry may illuminate the object from a range of angles in relation to the optical axis. By way of example, the illumination geometry may define a solid angle in which illumination beams may be incident on the object in one direction or at least two directions. The illumination solid angle may also be referred to as combination of illumination directions. Particularly fast imaging may be implemented by using illumination solid angles.

In general, different illumination directions used within the scope of the illumination geometries may be uncorrelated or correlated. In order to avoid speckle, illumination directions may be combined; this may be realized by virtue of e.g. no punctiform light sources, such as lasers or monomode fiber pencils, being used, but extended light sources, such as e.g. LEDs or multimode fibers, being used instead. Then, an illumination from a solid angle is achieved.

Other illumination geometries may also be used in the various disclosed scenarios: correlated illumination apparatuses may illuminate the object in a spatially modulated manner, i.e. the object may be illuminated by means of, for example, an interference pattern from two illumination directions. To this end, use may be made of moiré imaging techniques, i.e. the illumination geometry may comprise a moiré illumination. In accordance with the scenarios disclosed herein, a spatially modulated illumination geometry may be used to select the illumination direction which satisfies the optimization criterion to the best possible extent from a multiplicity of illumination directions.

As an alternative to different illumination directions, or in addition thereto, it is also possible to vary other properties of the illumination light within the scope of the at least two illumination geometries, for example the wavelength or the wavelength distribution or the polarization of the light. In one example, the at least two illumination geometries may comprise three illumination directions, wherein each one of the illumination directions is implemented by respectively one of three light-emitting diodes (LEDs), which shine in the three colors red, green and blue. By way of example, an organic LED (OLED) display apparatus may be used to this end. Alternatively, or additionally, use may be made of a polarization optical unit, such as a liquid crystal spatial light modulator (LC-SLM), which is configured to locally rotate the polarization of the illumination directions.

Very different techniques may be used in the combining process. By way of example, the various intensity images may be subtracted or added or multiplied or divided. In particular, the combining process may be carried out in a weighted form; different intensity images may be taken into account to a different extent during the combining process. This allows a parameter space to be optimized to be extended (combination parameter) in respect of the optimization criterion. The results image may be partly coherent as a result of the combining process.

The combination parameters may set the specific implementation of the combining process. By way of example, the combination parameters may set an arithmetic operation, by means of which the intensity images are combined. Alternatively, or additionally, the combination parameters may determine, for example, a weighting of the various intensity images during the combining process. By way of example, certain intensity images may be taken into account more strongly or more weakly than other intensity images during the combining process. What this may achieve is that the results image satisfies the optimization criterion particularly well. By way of example, the weighting of the various intensity images may satisfy various boundary conditions in this case, for example that weightings, by means of which the various intensity images are taken into account during the combining process, each assume a value greater than zero and less than one and that a sum of the weightings of the various intensity images equals one. Other boundary conditions are possible. By way of example, the combination parameters may be stored in the form of control instructions in a memory such that the combination parameters may be resorted to without much computational outlay for various routine problems. The combination parameters may be object-specific.

By illuminating the object with the various illumination geometries and as a result of combining the corresponding intensity images, it is possible to obtain an effect which corresponds to the conventional structured illumination. However, it is possible here to emulate very different structure filters comparatively easily by means of a suitable selection of e.g. the combination parameters. This may also take place within the scope of a post-processing step. In particular, a particularly suitable set of combination parameters may be found, e.g. within the scope of an optimization, said combination parameters satisfying the optimization criterion particularly well. In particular, it is possible to dispense with the corresponding hardware of the structure filter—the corresponding techniques may be implemented in a computer-implemented manner. This may facilitate obtaining, comparatively simply, good results for very different imaged objects.

By way of example, the combining process may be carried out with a spatial resolution for various regions of the intensity images such that the various regions of the results image satisfy the optimization criterion. By way of example, the various regions may image different parts of the object. An object may also consist of a plurality of partial objects, for example individual cells; in this case, the various regions may image different partial objects.

By way of example, the spatially resolved combining of the intensity images may be based on first combination parameters in a first region of the intensity images and on second combination parameters in a second region of the intensity images. The first combination parameters may differ from the second combination parameters. As a result, it may be possible for the optimization criterion to be satisfied comparatively well on a local scale, even in the case of comparatively complex objects which, for example, have different optical properties in various regions. Then, the results image may have a particularly high quality. In particular, it may be possible to make e.g. fine structures of the object visible in the various regions—even if the object has different optical properties or, for example, requires different combination parameters in the various regions. Compared to conventional structured illumination, in particular, this is advantageous in that it may be possible to dispense with the use of a spatially dependent structure filter, the structure of which varies for various positions. Nevertheless, the effective illumination geometry, which emerges, in particular, from combining the various intensity images, may be adapted in a spatially resolved manner for the various regions of the intensity images.

By way of example, it is possible for the illumination apparatus to comprise a light source with a plurality of tunable wavelengths. By way of example, this may be implemented by way of light-emitting diodes (LEDs) with different colors or may be implemented, for example, by way of a laser interchange unit. Accordingly, it would be possible for the illumination apparatus to comprise a polychromatic light source; at the same time, the detector may be configured to capture the intensity images in a wavelength-separated manner. By way of example, such a technique may be implemented using a so-called red-green-blue charge-coupled device (RGB-CCD). In such cases, it may be possible for the various techniques described above to be applied in the wavelength-dependent manner and for an improved polychromatic results image to be produced as a result thereof. The parameter space, relating to the optimization criterion, to be optimized may also be increased by selecting the wavelength.

By way of example, the sequential illumination with the at least two illumination geometries may be carried out multiple times for various wavelengths and a corresponding intensity image may be captured in each case. Alternatively, or additionally, it would also be possible for the sequential illumination to be carried out using a polychromatic light source of the illumination apparatus and for the capture of the corresponding intensity images to be carried out multiple times for various wavelengths. Combining the corresponding intensity images may be carried out in each case for producing an associated results image for the various wavelengths.

Thus, in this way it may be possible to obtain a set of results images, with each results image corresponding to a corresponding wavelength. By way of example, it would be possible to combine the various results images to form a polychromatic results image.

By means of such wavelength-dependent techniques described above, it may be possible to produce a results image which is of particularly high qualitative quality. In particular, it may be possible for the results image to satisfy the predetermined optimization criterion particularly well.

Illuminating the object and capturing the intensity image may define an image-capturing step. In general, it may be possible for the combining process to be carried out in real time during the image-capturing step. By way of example, the method may furthermore comprise: displaying the results image on a screen. Displaying may be carried out during the image-capturing step. As a result, it may be possible to obtain a qualitatively high-quality results image particularly quickly. In particular, this may render controlling the image capture on the basis of the results image possible.

Particularly in the cases described above, in which the combining process takes place in real time, it may be a goal worth pursuing to at least partly predetermine the combination parameters of the combining step—for example instead of carrying out a complete determination of the combination parameters during the image-capturing step.

By way of example, the method may furthermore comprise carrying out an optimization by means of the computing unit. Carrying out the optimization may provide the combination parameters for the combining process, by means of which the results image satisfies the predetermined optimization criterion.

Here, the combination parameters may be provided with spatial resolution. By way of example, the optimization may be carried out with spatial resolution for various regions of the intensity images. The combination parameters may be provided for the various regions in each case. Furthermore, it is possible that the combining process is carried out with spatial resolution for the various regions of the intensity images on the basis of the corresponding combination parameters.

Carrying out the optimization may also be carried out in a wavelength-resolved manner for various wavelengths of the illumination and/or detection.

By way of example, it may be possible for carrying out the optimization to be carried out in a calibrating step before the image-capturing step. Then, the combination parameters may be predetermined and the combining process may be carried out in real time during the image-capturing step. In such a scenario, in particular, it may be possible for the combining process to be carried out with spatial resolution for various regions of the intensity images. By way of example, it may be possible within the scope of the calibrating step to predetermine, with spatial resolution, the combination parameters or further parameters to be optimized. Then, it may be possible, for example by means of object tracking techniques or landmark identification techniques, to monitor a temporal profile of a position of the various regions. This may ensure that the fitting combination parameters or further parameters to be optimized are used in each case for the various regions.

However, it would also be possible for carrying out the optimization to be carried out in the post-processing step following the image-capturing step. By way of example, the method may furthermore comprise storing of image data. The image data may be based on the captured intensity images. The method may furthermore comprise storing associated control data which indicate the respective illumination geometry. Storing may occur in a non-volatile memory. The combining process may occur in a post-processing step following the image-capturing step. The combining may be carried out on the basis of the stored image data and control data. In this way, it may be possible, in particular, to determine, in a time-non-critical manner, the combination parameters or further parameters to be optimized, on which the combining process is based, by carrying out the optimization. In this way, it may be possible to determine the combination parameters or further parameters to be optimized with comparatively high precision. As a result, a particularly high quality of the results image may be achieved, i.e. the results image may satisfy the optimization criterion particularly well.

By way of example, carrying out the optimization may be effected with various techniques, the principles of which are known in advance. By way of example, use may be made of numerical techniques. Use may be made of evolutionary optimization algorithms. Use may be made of derivative-based optimization methods. Examples of such techniques include the Levenberg-Marquardt algorithm, Gaussian methods or methods of steepest descent, which are also referred to as so-called "steepest descent" algorithms. Use may also be made of other alternative optimization methods, such as simplex optimization.

In general, it may also be possible for the combination parameters or further parameters to be optimized to be selected on the basis of various properties, for example of the object and/or of the employed at least two illumination geometries, from a predetermined database containing possible combination parameters or further parameters to be optimized. By way of example, the database may contain those combination parameters for which it is known that the results image satisfies the predetermined optimization criterion particularly well in the case of specific objects and/or specific illumination geometries. In this way, a particularly simple and fast implementation of the combining process may be possible.

Very different techniques in relation to the optimization were explained above. Here, these techniques may be used in relation to different specific optimization criteria. By way of example, the optimization criterion may be selected from the following group: an image contrast; an edge steepness; an image sharpness; a quality of a modulation transfer function (MTF); a spatial-frequency-dependent optimization criterion. It is possible for the optimization criterion to be set in respect of one or more of the aforementioned variables. Here, the optimization criterion may comprise specific tolerance ranges or thresholds. Flexibly selecting the optimization criterion allows a results image to be produced in this way, the results image having a particularly high quality or being matched particularly well to the type of object examined.

By way of example, the aforementioned techniques may be combined with hardware-based filtering techniques. By way of example, illuminating may comprise the application of a structure filter of the illumination apparatus. By way of example, illuminating may comprise the application of a spatial filter of the illumination apparatus. Thus, appropriate filters may be placed into a beam path of the light, e.g. between a light source and the object, during the illumination process.

By linking the combination of the intensity images with such hardware-based techniques, it is possible to obtain a particularly efficient implementation of the techniques for producing the results image. In particular, it may be possible, for example, to reduce computational capacities required to carry out the techniques. In particular, the intensity images may already be preconditioned on a hardware-implemented basis in such a way that the optimization criterion may be satisfied comparatively easily.

Alternatively, or additionally, such effects may also be obtained by corresponding post-processing of the intensity images by means of the computing unit. The post-processing may be carried out, in turn, during the image-capturing step or the post-processing step. By way of example, the method may—before combining the intensity images—furthermore comprise: applying an operator to the captured intensity images by means of the computing unit, for the purposes of adapting the intensity images. In general, the operator may be selected in very different ways. By way of example, the operator may be selected from the following group: weighting; amplification; damping; absolute value; squaring; taking a root; reversing the sign; smoothing pixel values; aberration correction of pixels; normalizing to a mean value of pixel values of the respective intensity image; applying a spatial filter.

Expressed differently, the individual intensity images may thus be combined by calculation using special filters before said individual intensity images are combined. A special embodiment contains the application of the aforementioned spatial filter, for example in a computer-implemented manner and/or by way of a hardware implementation. Here, for each illumination direction of the illumination geometries, the spatial filter may damp structures of the object which are arranged in a plane set by the illumination direction and an optical axis of the optical apparatus in relation to structures arranged perpendicular to this plane. As a result, the effect of a particularly elevated image contrast may be achieved. This is because illumination directions typically contrast structures perpendicular to the aforementioned plane more strongly than structures within the aforementioned plane. This effect may be amplified by a selective damping on the basis of the spatial filter, as described above.

In accordance with a further aspect, the present invention relates to an optical apparatus. The optical apparatus is configured to produce a results image of an object. The optical apparatus comprises an illumination apparatus. The illumination apparatus is configured to illuminate the object sequentially using at least two illumination geometries. The optical apparatus furthermore comprises a detector configured to capture an intensity image of the object for each one of the at least two illumination geometries during illumination with the respective illumination geometry. The optical apparatus furthermore comprises a computing unit. The computing unit is configured to combine the intensity images for the purposes of producing the results image. Here, combining is carried out in such a way that the results image satisfies a predetermined optimization criterion.

By way of example, the optical apparatus in accordance with the currently discussed aspect may be configured to carry out the method for producing a results image in accordance with a further aspect of the present invention.

Effects may be obtained for such an optical apparatus in accordance with the currently discussed aspect which are comparable to the effects which may be obtained for the method for producing a results image in accordance with a further aspect of the present invention.

The features presented above and features described below may be used not only in the corresponding explicitly presented combinations but also in further combinations or on their own, without departing from the scope of protection of the present invention.

BRIEF DESCRIPTION OF THE FIGURES

The above-described properties, features and advantages of this invention, and the manner in which they are achieved, become clearer and more easily understandable in conjunction with the following description of the exemplary embodiments, which are explained in more detail in conjunction with the drawings.

DETAILED DESCRIPTION OF EXEMPLARY EMBODIMENTS

Figure 1:
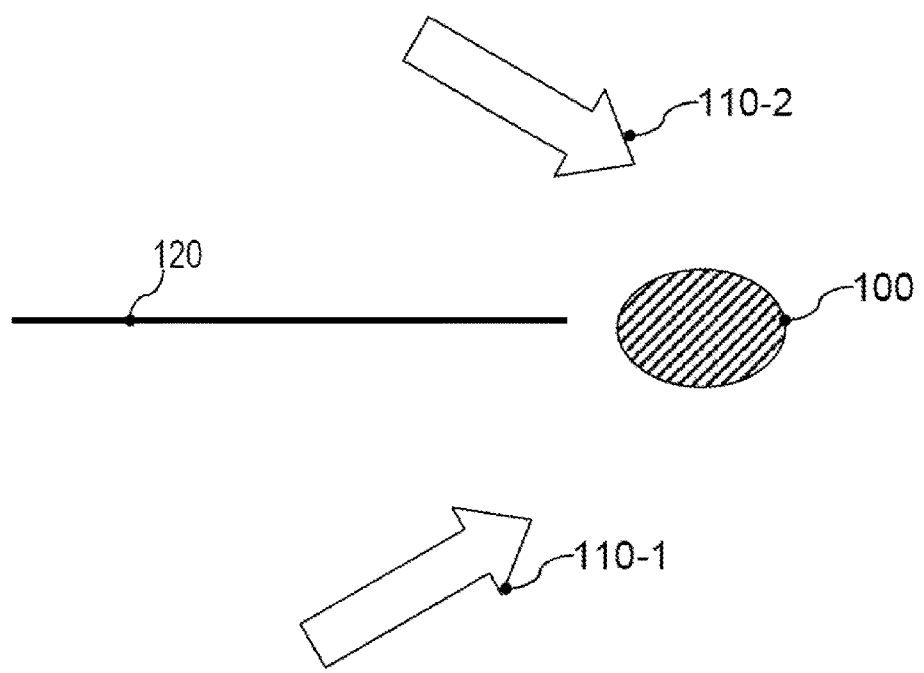
FIG. 1 schematically illustrates the illumination of an object using various illumination geometries.

Below, the present invention is explained in more detail on the basis of preferred embodiments, with reference being made to the drawings. In the figures, the same reference signs denote the same or similar elements. The figures are schematic illustrations of various embodiments of the invention. Elements depicted in the figures are not necessarily depicted true to scale. Rather, the various elements depicted in the figures are reproduced in such a way that the function and purpose thereof is rendered comprehensible to a person skilled in the art.

Connections and couplings between functional units and elements depicted in the figures may also be implemented as indirect connections and couplings. A connection or coupling may be implemented in a wired or wireless manner.

Techniques in which an object is illuminated using various illumination geometries are illustrated below. Here, the illumination geometries may relate, in particular, to different illumination directions and/or different illumination solid angles. An intensity image is captured in each case for the various illumination geometries. The various intensity images are combined, for example by way of addition, to form a results image. Within the combining process, it is possible to take into account, either selectively or comparatively prominently, those intensity images in particular which contribute to an increase in contrast or resolution or, in general, to an optimization criterion being satisfied better; such weighting of the influence of the various intensity images on the results image may be achieved, for example, by using weightings within the combining process. Combining may be carried out with spatial resolution. As an alternative to such combination parameters, or in addition thereto, it is also possible to take into account other parameters to be optimized in respect of the optimization criterion, such as e.g. a wavelength at which the respective intensity image images the object or the application of an operator on the respective intensity image before the combining process.

Such techniques may also be referred to as partially coherent microscopic imaging. Partially coherent microscopic imaging is understood to mean imaging using illumination with an uncorrelated light source, i.e. a spatially incoherent effective light source, the extent or form of which deviates from the entrance pupil of the optical imaging system. The illumination apparatus may have an appropriate embodiment in the various disclosed scenarios.

Typically, the contrast transfer function may be influenced by way of the form and size of the effective light source. In principle, a contrast transfer between 1 and the resolution limit is achievable for every object frequency, see e.g. FIGS. 2-5 in H. Siedentopf, "Die Sichtbarmachung von Kanten im mikroskopischen Bilde" in Zeitschr. f. wiss. Mikroskopie vol. XXV (1908).

Formally, the partially incoherent imaging in accordance with reference implementations may be described as incoherent sum of many coherent individual or partial images, wherein the resultant summed image may be prepared digitally according to conventional methods in accordance with the reference implementations; expressed concisely, this may be expressed as: a sum over coherent individual images or intensity images results in a partially coherent image which, in turn, may be post-processed digitally.

In accordance with the techniques described herein, the digital post-processing may already take place in relation to the individual images or intensity images, e.g. in relation to quasi-coherent individual images. Then, the digitally post-processed or adapted intensity images may be combined.

Such techniques render it possible to produce a high information depth of the results image; expressed differently, the results image may image the object particularly well or rich in detail. The information content of the results image is comparatively high. In particular, such techniques may obtain results which are comparable to results which may be achieved by means of conventional structured illumination. However, in the process, it may be possible to dispense with providing appropriate hardware; in particular, it may be possible to dispense with providing corresponding structure filters. The present techniques may be carried out, in particular, in a post-processing step after an image-capturing step.

Corresponding techniques may be carried out comparatively quickly. By way of example, the combining process may be implemented by appropriate hardware coding of a corresponding process. Using this, the present techniques may be carried out, in particular, in real time. This may facilitate an application for time-resolved imaging. This includes e.g. cell morphology analysis, growth analysis, infection analysis and automated measurement of objects. It would also be possible to implement the combining process by software.

FIG. 1 illustrates the illumination of an object 100 using different illumination geometries 110-1, 110-2. In accordance with the techniques described herein, the object 100 is illuminated sequentially using the two illumination geometries 110-1, 110-2 by means of an appropriate illumination apparatus (not shown in FIG. 1). Then, an intensity image of the object 100 may be captured during the illuminating process for each one of the two illumination geometries 110-1, 110-2 by means of a detector (not shown in FIG. 1). These intensity images may then be combined to produce the results image. Combining is carried out in such a way that the results image satisfies a predetermined optimization criterion. FIG. 1 also depicts an optical axis 120 of the optical apparatus. The optical axis 120 may denote that axis of the optical apparatus along which an idealized light ray does not experience any deflection, or only experiences a little deflection.

Figure 2:
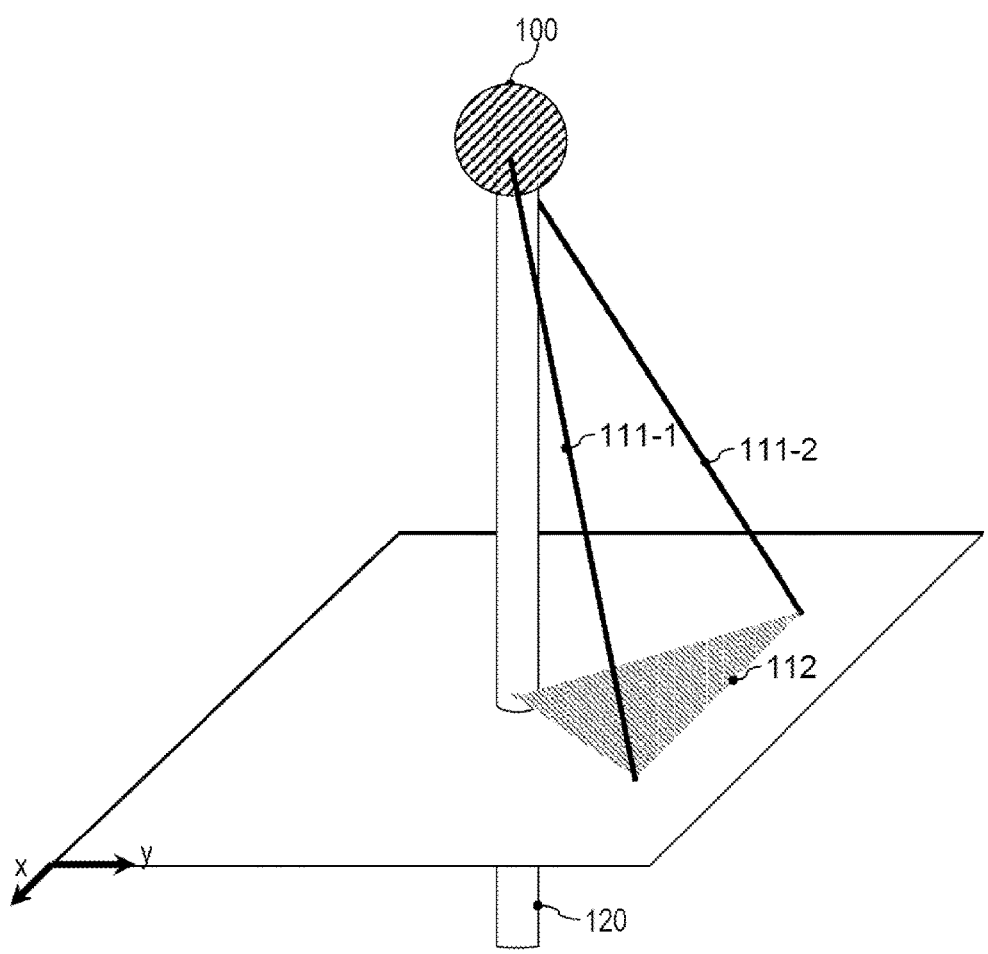
FIG. 2 schematically illustrates the illumination of the object using the various illumination geometries in greater detail than in FIG. 1.
Figure 3:
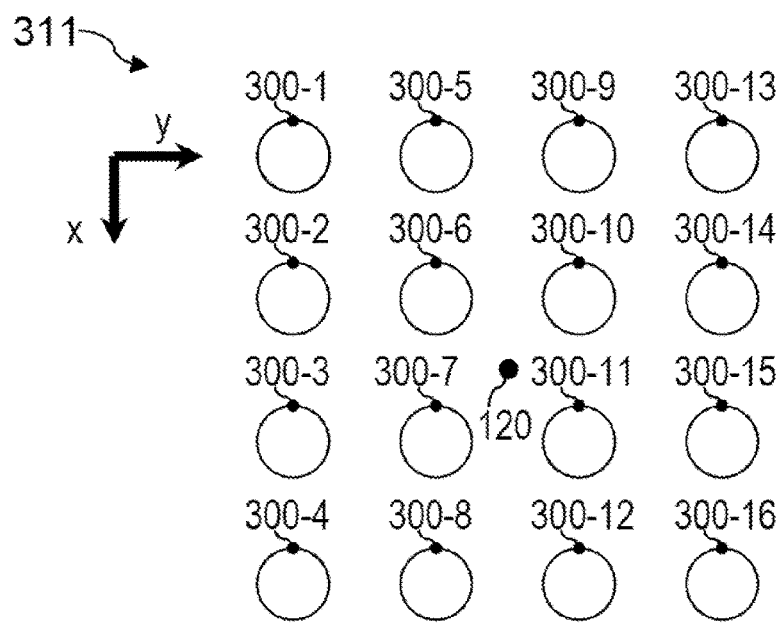
FIG. 3 schematically illustrates an illumination apparatus comprising an LED array and configured to illuminate the object using the various illumination geometries.

FIG. 2 depicts a scenario corresponding to FIG. 1 in three dimensions. FIG. 2 depicts two illumination directions 111-1, 111-2, by means of which the object 100 may be illuminated in accordance with the two illumination geometries 110-1, 110-2. What is shown in FIG. 2 is that the two illumination directions 111-1, 111-2 include a well-defined angle with the optical axis 120. It is possible to define a so-called illumination vector.

However, it may be dispensable to use well-defined illumination directions 111-1, 111-2 for the purposes of illuminating the object 100 in various scenarios. Rather, it may be possible for the various illumination geometries 110-1, 110-2 to comprise illumination solid angles 112. However, it is not necessary for the illumination geometries to be contiguous and convex. While reference is made in part below to illumination solid angles, it is also possible, in all described exemplary embodiments, to use illumination geometries in which illumination rays are not incident on the object in a contiguous angle region and/or in a convex angle region. Thus, in particular, a combination of a plurality of illumination directions, which are not arranged in contiguous fashion, may be present in the various scenarios disclosed herein.

FIG. 2 depicts an illumination solid angle 112 (depicted with hatching in FIG. 2) in an exemplary manner, said illumination solid angle being delimited by the aforementioned illumination directions 111-1, 111-2. Expressed differently, the illumination solid angle 112 may therefore comprise a multiplicity of different illumination directions 111-1, 111-2 and extend over a certain angular range in relation to the optical axis 120.

In general, very different illumination apparatuses may be used to provide the various illumination geometries 110-1, 110-2. By way of example, a scanning mirror may be used, for example in a field-stop plane of the illumination apparatus. Use could also be made of an adaptive component in an aperture stop or illumination pupil of the illumination apparatus; by way of example, use could be made of the illumination apparatus pursuant to the German patent application 10 2014 101 219.4. It would also be possible for the illumination apparatus 311 to comprise an LED array (cf. FIG. 3). By way of example, the LEDs 300-1-300-16 of the LED array may be arranged in accordance with a Cartesian grid, wherein unit cells of the grid may have a quadratic or rectangular configuration. Other grids may also be implemented, for example hexagonal grids, etc. By way of example, it would also be possible for the LED array to comprise a ring of LEDs or a plurality of rings of LEDs, for example with different radii. Then, it is possible to implement a specific illumination direction, for example by actuating a specific light-emitting diode of the LED array, which has a specific distance in relation to the optical axis.

Figure 4A:
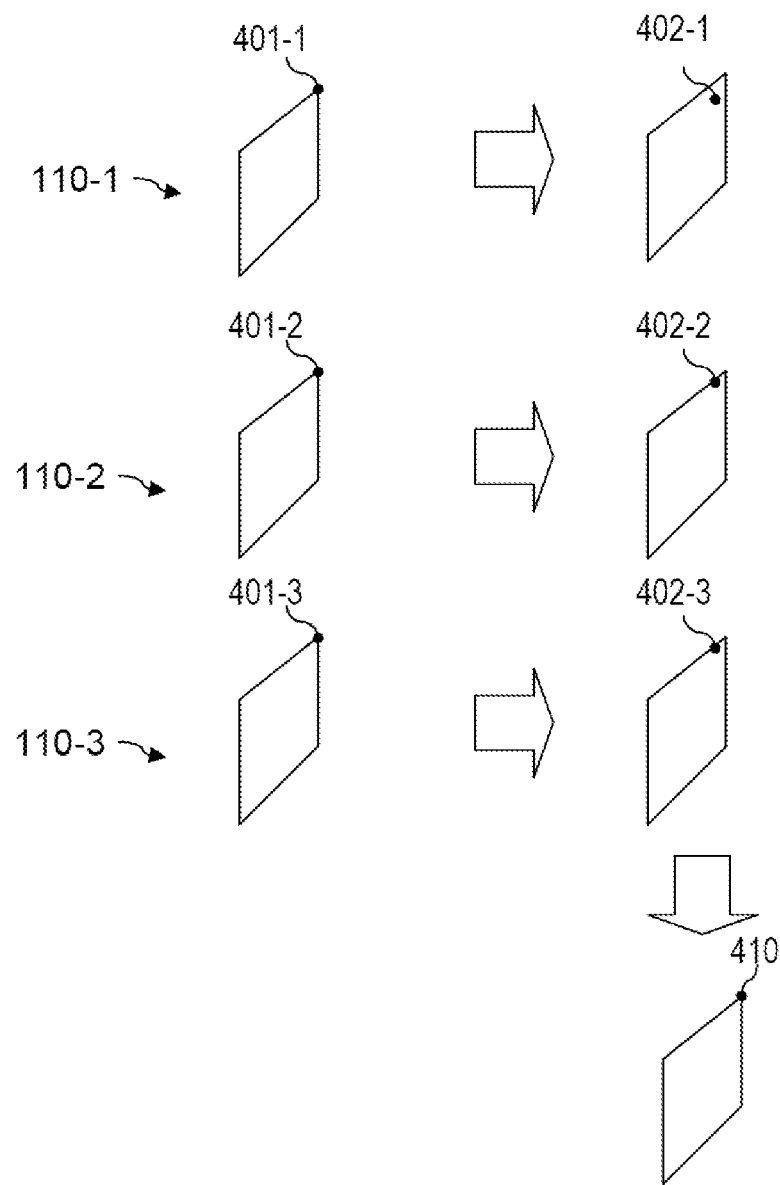
FIG. 4A schematically illustrates the application of an operator on various intensity images which image the object, and the combination of the intensity images processed in this way for the purposes of producing a results image.

FIG. 4A depicts the combination of the intensity images 401-1-401-3 captured with three different illumination geometries 110-1, 110-2, 110-3. In accordance with the embodiment in FIG. 4A, the various intensity images 401-1-401-3 are initially processed before they are ultimately combined to form the results image 410.

By way of example, to this end, an operator may be applied to the captured intensity images 401-1-401-3. By way of example, the operator may be selected from the following group: weighting; amplification; damping; absolute value; squaring; taking a root; reversing the sign; smoothing pixels; aberration correction of pixels; normalizing to a mean value of pixels of the respective intensity image 401-1-401-6; and applying a spatial filter.

Thus, in accordance with the techniques described herein, it is possible to synthetically reproduce a preferred illumination for specific objects by virtue of being able to record individual intensity images for each light source point—i.e. for the various illumination directions. Then, these intensity images may be combined with one another or combined with one another by computation. Pure addition of the images would correspond to conventional partially coherent imaging. A weighted selection of selected images would then correspond to the procedure for source mask optimization (SMO) within the scope of lithography. Appropriate operators may be used, as are known from e.g. SMO as a matter of principle. However, it should be noted here that the object to be produced is known within the scope of lithography, while the object in the present case is possibly unknown a priori. Thus, use may be made of operators which reproduce different illuminations, such as e.g. an annular illumination, dipole illumination, Rheinberg color contrast, dark-field phase contrast, etc.

Formally, the application of the operator to the captured intensity images and the combination of the intensity images may be expressed by:

$$I(x) = \sum_q G(q)I(x, q),$$

where:

x: spatial coordinate;
q: pupil coordinate or illumination direction;
I(x): intensity image;
G(q): operator function for the individual illumination directions; and
I(x,q): partial image for one illumination direction q.

In various scenarios, the operator G may correspond to, for example, a global weighting of the various illumination directions, i.e. have no dependence on the location x.

In further scenarios, use may be made of local operators, i.e. operators which have a dependence on the location x. An example would be proportional local contrast criteria (micro-contrasts). That is to say, the operator may have a spatial dependence, G(x,q).

Thus the following would arise:

$$I(x) = \sum_q G(x, q)I(x, q).$$

G(x,q): location-dependent and illumination direction-dependent operator function, i.e. each operator for an illumination direction may be spatially dependent.

By applying such operators, it may be possible to process the various intensity images 401-1-401-3 in such a way that they are able to be handled particularly well within the scope of combining, for example they have comparable signal amplitudes and/or have known aberrations already removed from them in a timely fashion. As a result, the quality of the results image 410 may be increased.

Various examples for operators are explained below.

By way of example, use may be made of multiplicative operators. Use may be made of operators which, for example, take into account the normalized local contrast, the normalized local intensity and/or the normalized intensity gradient. By way of example, the maximum intensity $N_2(q)= \max(I(x, q))$ in an intensity image or the overall intensity in an intensity image $$N_1(q) = \sum_x I(x, q)$$

may be used as norm for these variables. Other norms are also possible.

The normalized gradient set out below is illustrated as an example for the aforementioned examples for the operator:

$$LS(x, q) = \frac{\nabla I(x, q)}{N_i}$$

Image components with a comparatively small intensity gradient or comparatively small brightness are typically suppressed by this operator; therefore, the operator acts as a filter. Large gradients are present at edges, and so this operator acts as an edge-enhancing filter.

A corresponding function—as illustrated above in a purely exemplary manner in respect of the normalized gradient—may be used directly as an operator or may initially be converted into a threshold function in order to obtain a threshold operator:

$$G(x, q) = \begin{cases} 1 & LS(x, q) \geq S \\ 0 & LS(x, q) < S \end{cases}$$

A further example for an operator is a morphological operator: here, content of the intensity image is not only evaluated according to local criteria, but global criteria and/or surrounding criteria for other spatial points x' are taken into account. By way of example, such operations are dilatation or erosion, corresponding to edge filters or filters for noise reduction (noise filters). These operators may be represented by the following function:

$$I(x) = \sum_{q,x'} G(x, x', q)I(x', q)$$

In general, the operators may also take into account information from other intensity images. By way of example, if a certain object detail has already been sufficiently extracted by way of filtering from a specific intensity image or some specific intensity images, said object detail may be suppressed in the remaining intensity images. Therefore, the operator may be written as:

$$I(x) = \sum_{q,x',q'} G(x, x', q, q')F\{I(x', q); I(x', q')\}I(x, q)$$

with a function F{ . . . } on the individual intensity images, with GF describing the operator.

By way of example, it is to be expected that edges are imaged particularly well by illumination directions aligned perpendicular to the edge. Then, intensity images from other illumination directions may be suppressed locally by means of the operator for such an identified edge.

The weighting function $G(x,x',q,q')$ may be determined at the individual intensity images initially and then be improved further by optimizing the overall image such that a user obtains a desired object detail imaged particularly well in relation to the optimization criterion.

In general, it is also possible that certain effects which are achieved by means of the above-described techniques of applying an operator may be generated by the use of suitable hardware. By way of example, it may be possible for the illumination to comprise the application of a spatial filter of the illumination direction. The hardware-implemented spatial filter may obtain comparable effects to those which may be obtained using a software-based spatial filter. At the same time, it is possible to reduce computational outlay. The software-based spatial filter may have increased flexibility in the application thereof.

By way of example, the aforementioned hardware-implemented and/or software-implemented spatial filter may be used to satisfy an optimization criterion relating to the image contrast particularly well. Thus, the spatial filter may act along specific directions. By way of example, the spatial filter may act by selective amplifying/damping of frequencies of a Fourier transform of the intensity images 401-1-401-3. In the process, it is possible to take into account an orientation of the corresponding contributions to the spectrum. In this respect, reference is made to FIG. 2. The spatial filter may act selectively along those directions which lie in a plane spanned by the optical axis 120 and the respective illumination direction 111-1, 111-2; by way of example, the spatial filter is able to amplify (dampen) structures of the object 100 which are oriented along (perpendicular to) this plane. This may increase an effect which may be obtained using the intensity images 401-1-401-3 belonging to the two illumination directions 111-1, 111-2. By way of example, the intensity image 401-1-401-3, which is captured for illumination using the first illumination direction 111-1, already has a particularly high image contrast for structures of the object 100 which lie in the plane spanned by the optical axis 120 and the first illumination direction 111-1. This effect may be amplified further by the spatial filter. The results image 410 then satisfies the corresponding optimization criterion defined in relation to the image contrast particularly well.

Returning to FIG. 4A: the processed intensity images are reproduced on the right-hand side in FIG. 4A and may be referred to as, for example, initial images 402-1-402-3. The various initial images 402-1-402-3 may then be combined to form the results image 410. Here, combining may be carried out by e.g. summing, subtracting, dividing or multiplying the various initial images 402-1-402-3 amongst themselves. By way of example, weighting factors for the individual initial images 402-1-402-3 may be taken into account when combining the various initial images 402-1-402-3. As a result, the influence of the various initial images 402-1-402-3 on the results image 410 may be controlled. In particular, what may be achieved thereby is that the combining process is carried out in such a way that the results image 410 satisfies the predetermined optimization criterion. Such parameters and further parameters of the combining process may also be referred to as combination parameter.

In general, the combination parameters may be determined by carrying out an optimization. Here, the optimization may be carried out in such a way that combination parameters which satisfy the optimization criterion to the best possible extent are determined. Here, very different optimization criteria are possible. By way of example, the optimization criterion may relate to an image contrast and/or an edge steepness and/or an image sharpness and/or a quality of a modulation transfer function and/or a spatial-frequency-dependent optimization criterion.

In general, the optimization may provide for capturing individual intensity images from different illumination directions and producing such a results image of the object which satisfies a specific imaging problem or the optimization criterion particularly well from the individual intensity images. From this, it is possible to derive control instructions which determine a recipe for this preferred production of the results image; the control instructions or the recipe may be object-specific. In the various scenarios, these control instructions may comprise the combination parameters with which the results image satisfies the predetermined optimization criterion.

By way of example, if the optimization finds that not all of the originally envisaged illumination directions are required or that specific illumination directions may be combined in groups, the imaging problem may be carried out in a more targeted and faster manner in future by leaving out the illumination directions which are not required. This may be stored in the control instructions.

In the various scenarios disclosed herein, the optimization may be carried out in such a way that the number of illumination geometries or intensity images is selected to be as small as possible. It is possible for the optimization to be carried out in such a way that a time interval required for imaging or capturing the intensity images becomes as short as possible. It is possible for the optimization to be selected in such a way that the number of illumination directions and/or illumination solid angles is selected to be as small as possible. By way of example, such properties in respect of the optimization may be predetermined boundary conditions, with the optimization itself e.g. still being carried out in relation to the predetermined optimization criterion. In this way, the imaging object may be carried out particularly quickly, with the optimization criterion being satisfied particularly well at the same time.

In the case of routine problems, such as e.g. an optical inspection, the objects typically do not change substantially, and so control instructions may be carried out repeatedly for a given imaging problem. In general, it is also possible to store a plurality of control instructions for various predetermined objects in a memory such that a specific recipe may be selected, preferably automatically, for combining the intensity images or for applying the operator.

In general, it is possible for the combination to require comparatively little computing intensity—particularly when compared to carrying out the optimization or determining the combination parameters. Therefore, it may be a goal worth pursuing to determine the combination parameters already prior to the image-capturing step—e.g. within the scope of the calibration step.

It would also be possible for the combination parameters to be determined after the image-capturing step, for example within the scope of a post-processing step. By way of example, the image data, which are based on the captured intensity images 401-1-401-3, and associated control data, which indicate the respective illumination geometry 110-1, 110-2, could be stored in a non-volatile memory to this end. When the post-processing step is intended to be carried out, it may be possible to obtain the various image data and the associated control data from the non-volatile memory. Then, combining may be carried out on the basis of the stored image data and control data. In particular, the optimization for determining the combination parameters on the basis of the stored image data and control data may also be carried out.

Figure 4B:
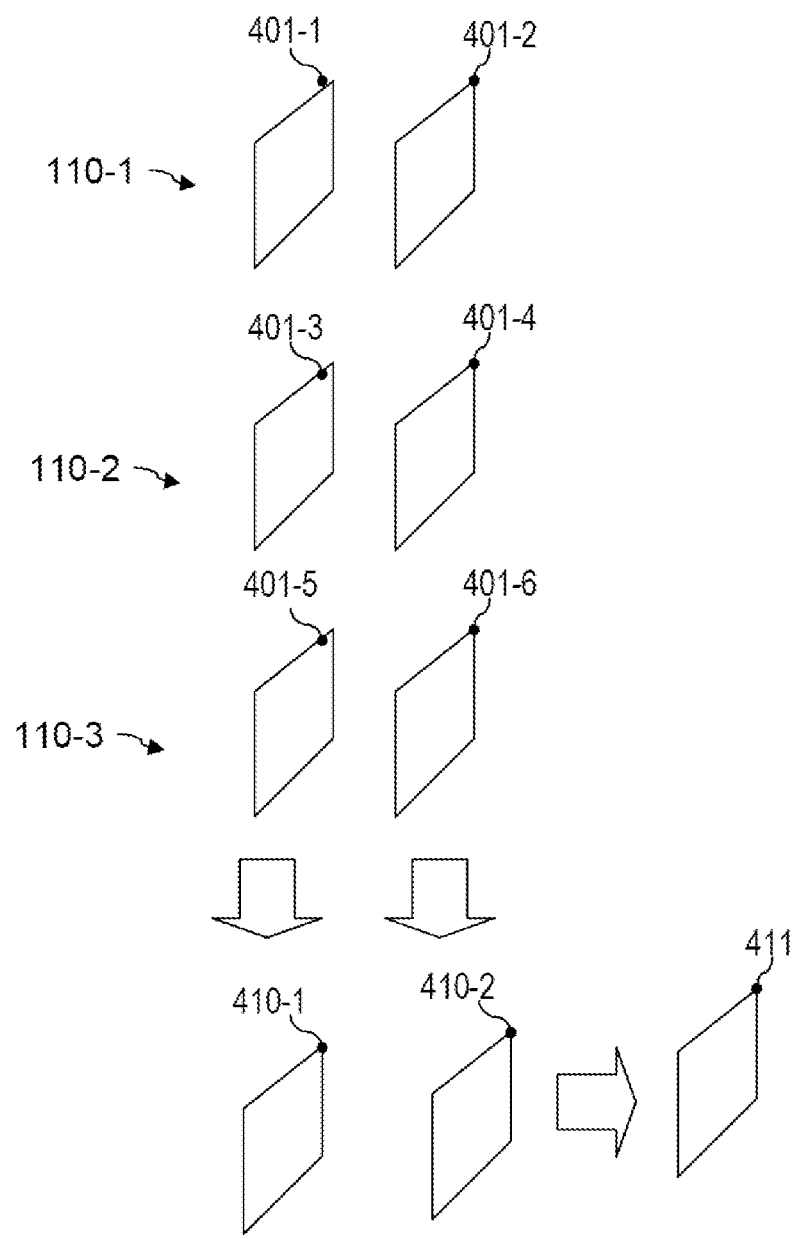
FIG. 4B schematically illustrates the wavelength-resolved combination of various intensity images which image the object, for the purposes of producing a results image.

FIG. 4B illustrates a scenario in which the various intensity images 401-1-401-6 are combined in a wavelength-dependent manner. In the scenario of FIG. 4B, two intensity images 401-1-401-6 are respectively captured for the three illumination geometries 110-1-110-3. Here, a first one of the intensity images 401-1, 401-3, 401-5 is respectively captured when the object 100 is illuminated at a first wavelength; a second one of the intensity images 401-2, 401-4, 401-6 is respectively captured when the object 100 is illuminated at a second wavelength which differs from the first wavelength. Then, for each one of the various illumination geometries 110-1-110-3, the intensity images 401-1, 401-3, 401-5 assigned to the first wavelength and the intensity images 401-2, 401-4, 401-6 assigned to the second wavelength are respectively combined to form a results image 410-1, 410-2. Expressed differently, the sequential illumination with at least two illumination geometries 110-1-110-3 is carried out for various wavelengths and the corresponding intensity images 401-1-401-6 are respectively combined for producing an associated results image 410-1, 410-2 for the various wavelengths. Optionally, it would be possible to combine the two results images 410-1, 410-2 to form a polychromatic results image 411.

Alternatively, or additionally, it would also be possible to combine all intensity images 401-1-401-6 of the various wavelengths to form a single results image 410 and, in the process, use the various wavelengths as a further parameter in the parameter space of the optimization in respect of the optimization criterion.

A scenario in which the illumination of the object 100 is carried out sequentially with various wavelengths was illustrated with reference to FIG. 4B. However, alternatively, it would also be possible to use a polychromatic light source and use a wavelength-selective detector for producing the various results images 401-1-401-6.

Figure 5:
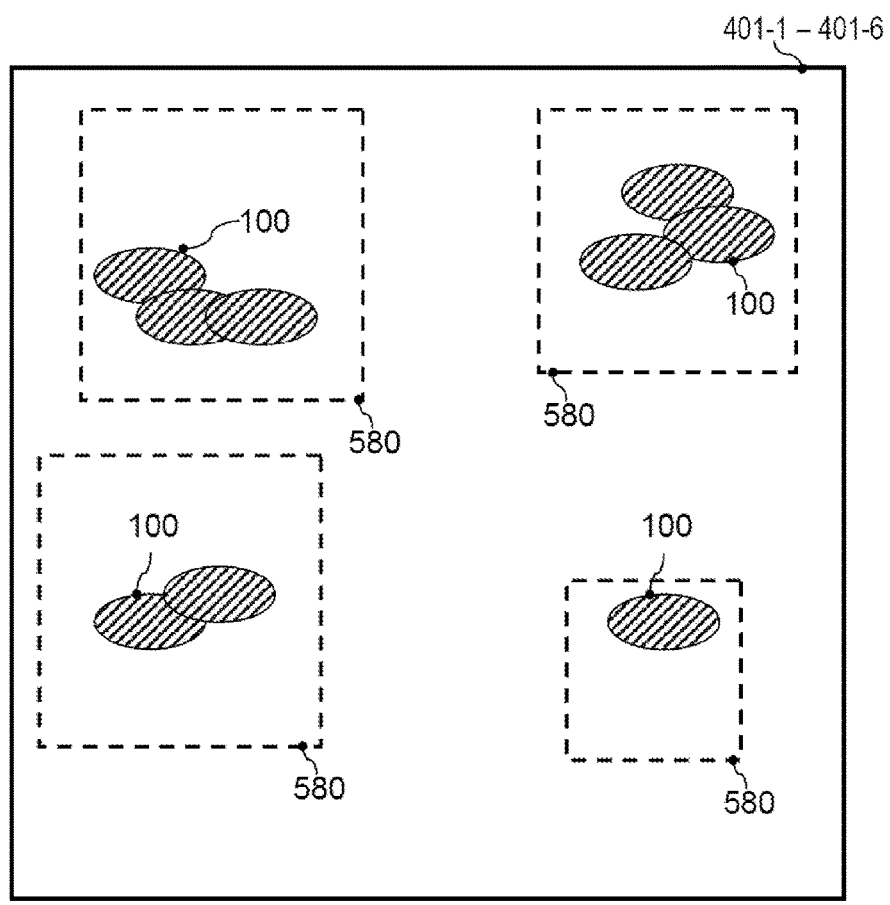
FIG. 5 schematically illustrates the combination of various intensity images which image the object, for the purposes of producing a results image, with the combining being carried out in a spatially resolved manner.

By way of example, the optimization may be carried out in a spatially resolved manner for the various regions 580. Then, the combination parameters may be provided in each case for the various regions 580 and the combination may be carried out in a spatially resolved manner for the various regions 580 on the basis of the corresponding combination parameters. Thus, the combining process may be carried out with a spatial resolution for various regions 580 of the intensity images 401-1-401-6, as depicted in FIG. 5. What this may achieve is that the various regions 580 of the results image 410, 410-1, 410-2, 411 each satisfy the optimization criterion. By way of example, different parts of the object 100 may have different optical properties. In this way, it may not be possible, or only possible to a restricted extent, to satisfy a comparatively strict optimization criterion equally well for all regions 580 when integrally determining the combination parameters in a uniform fashion for the entire intensity images 401-1-401-6. This is why the spatially resolved combining process may render it possible to satisfy a comparatively strict optimization criterion particularly well for the various regions 580, with, however, locally different combination parameters being taken into account.

Figure 6:
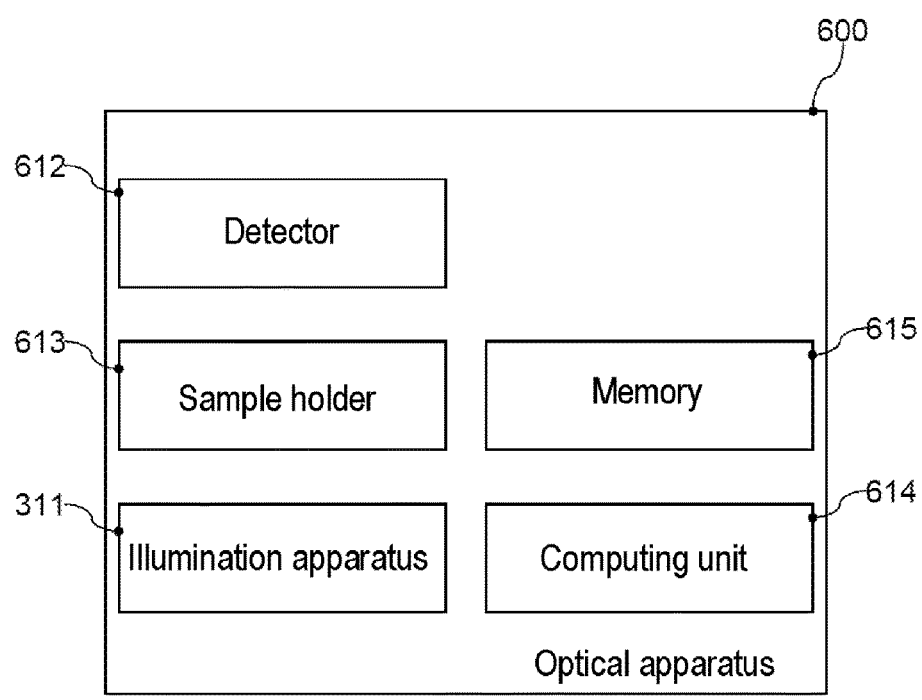
FIG. 6 schematically illustrates an optical apparatus configured to carry out techniques in accordance with various embodiments.

FIG. 6 depicts an optical apparatus 600 which may be used to implement the techniques described above. The optical apparatus 600 comprises an illumination apparatus 311, for example in the form of the LED array (cf. FIG. 3).

The object 100 is held in an optical path of the light from the illumination apparatus 311 to the detector 612 by way of a sample holder 613. By way of example, a transmission geometry or reflection geometry may be implemented. Further, the optical apparatus 600 comprises a computing unit 614. The computing unit 614 is configured to carry out the various steps for producing the results image 410, 410-1, 410-2, 411 (cf. FIGS. 4A and 4B). The optical apparatus 600 furthermore comprises a non-volatile memory 615. The memory 615 may comprise appropriate control information for the computing unit 614 such that the latter may carry out the various techniques for producing the results image 410, 410-1, 410-2, 411, as described above. The memory 615 may alternatively, or additionally, also store image data of the intensity images 401-1-401-6 and associated control data which indicate the respective illumination geometry 110-1-110-3. Then, it may be possible for the processor to produce the results image 410, 410-1, 410-2, 411 by accessing the memory in the post-processing step. The memory 615 may also store the control instructions and/or the combination parameters which are used to carry out specific imaging objects repeatedly such that the optimization criterion is satisfied.

In the scenario of FIG. 6, the computing unit 614 is integrated into the optical apparatus. In other scenarios, the computing unit 614 and, for example, the memory 615 may also be provided separately. However, in the case of changeable objects, for example, carrying out the optimization anew each time may be a goal worth pursuing; in this respect, it may be advantageous to integrate the computing unit 614 configured to carry out the optimization into the optical apparatus 600.

Figure 7:
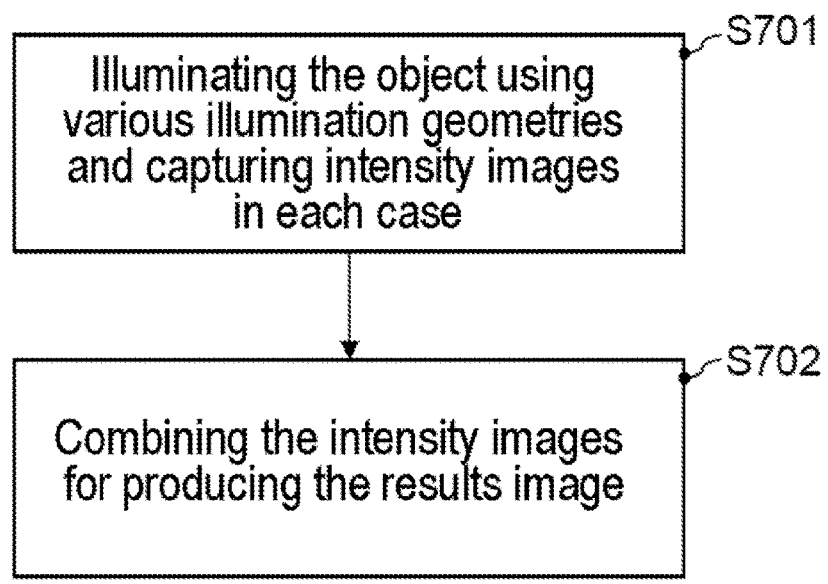
FIG. 7 is a flowchart of a method in accordance with various embodiments.

FIG. 7 illustrates a flowchart of a method for producing the results image 410, 410-1, 410-2, 411 in accordance with various embodiments. In S701, the object 100 is initially illuminated sequentially with the various illumination geometries 110-1-110-3 and an intensity image 401-1-401-6 is captured in each case. S701 corresponds to the image-capturing step.

Then, combining the captured intensity images 401-1-401-6 to produce the results image 410, 410-1, 410-2, 411 is carried out in S702 such that said results image satisfies the optimization criterion. Within the scope of S702, an operator may also be applied to the intensity images in order to process the latter prior to the combining process.

In various embodiments, S702 may be carried out in real time in relation to S701. Then, it may be possible to display the results image 410, 410-1, 410-2, 411 on a monitor in real time. However, it may also be possible for S702 to be carried out in a post-processing step, which is spaced apart in time in relation to the image-capturing step. This may be a goal worth pursuing, in particular if an optimization in relation to the optimization criterion is carried out by means of the computing unit 614 within the scope of S702, with the optimization providing combination parameters for the combining process. This is because such carrying out of the optimization may be comparatively computationally intensive and, as a result thereof, is not able to be carried out in real time, or only able to be carried out to a restricted extent in real time, in relation to the image-capturing S701.

Thus, techniques by means of which a results image may be determined on the basis of a plurality of intensity images captured for various illumination geometries were explained above.

In particular, the results image may have image properties which are comparable to image properties which may be achieved by means of a conventional hardware-implemented structured illumination. Here, the techniques described above have various advantages in relation to the conventional structured illumination: for example, any structured illumination pupil may be used—in particular, it is not necessary to keep available very different structure filters and a corresponding mask change unit; various illumination pupils may be realized for various parts of an image—in other words, the captured intensity images may be combined with spatial resolution; the techniques explained above may be carried out in a computer-implemented manner and may be combined with hardware-implemented preconditioning of the various captured intensity images; off-line post-processing is possible—in particular, it may be possible to subsequently optimize the various combination parameters such that the results image has a particularly high quality.

Naturally, the features of the embodiments described above and aspects of the invention may be combined with one another. In particular, the features may be used not only in the described combinations but also in other combinations or on their own, without departing from the field of the invention.

The invention claimed is:

1. A method for producing a results image of an object by means of an optical apparatus, wherein the method comprises:
   sequentially illuminating the object using at least two illumination geometries by means of an illumination apparatus of the optical apparatus,
   for each one of the at least two illumination geometries: capturing an intensity image of the object by means of a detector of the optical apparatus during illumination with the respective illumination geometry, and
   combining the intensity images for producing the results image by means of a computing unit,
   wherein combining is carried out in such a way that the results image satisfies a predetermined numerical optimization criterion, and
   further wherein combining is carried out with a spatial resolution for various regions of the intensity images such that the various regions of the results image satisfy the predetermined numerical optimization criterion.

2. The method as claimed in claim 1,
   wherein sequential illumination using the at least two illumination geometries and/or capture of the corresponding intensity images is carried out a number of times for various wavelengths,
   wherein combining the corresponding intensity images is carried out in each case for producing an associated results image for the various wavelengths.

3. The method as claimed in claim 1,
   wherein the method furthermore comprises:
   carrying out an optimization by means of the computing unit, wherein carrying out the optimization provides combination parameters for carrying out the combination, by means of which the results image satisfies the predetermined numerical optimization criterion.

4. The method as claimed in claim 3,
   wherein the optimization is carried out with a spatial resolution for various regions of the intensity images,
   wherein the combination parameters are respectively provided for the various regions, and
   wherein combining is carried out with a spatial resolution for the various regions of the intensity images on the basis of the corresponding combination parameters.

5. The method as claimed in claim 3,
   wherein carrying out the optimization considers at least one boundary condition selected from the following group: a number of captured intensity images; a number of illumination geometries; a number of illumination directions; a number of illumination solid angles; a time interval for capturing the intensity images.

6. The method as claimed in claim 1,
   wherein the predetermined numerical optimization criterion is selected from the following group: an image contrast; an edge steepness; an image sharpness; a quality of a modulation transfer function; a spatial-frequency-dependent optimization criterion.

7. The method as claimed in claim 1,
   wherein the at least two illumination geometries comprise different illumination directions and/or different illumination solid angles.

8. The method as claimed in claim 1,
   wherein at least one illumination geometry of the at least two illumination geometries comprises at least two illumination directions.

9. The method as claimed in claim 1,
   wherein the at least two illumination geometries have different colors and/or polarizations of the light used for illumination.

10. The method as claimed in claim 1,
    wherein the at least two illumination geometries have different interference patterns.

11. The method as claimed in claim 1,
    wherein the illumination comprises applying a spatial filter of the illumination apparatus.

12. The method as claimed in claim 11,
    wherein the at least two illumination geometries comprise different illumination directions,
    wherein, for each illumination direction, the spatial filter damps structures of the object which are arranged in a plane set by the illumination direction and an optical axis of the optical apparatus in relation to structures arranged perpendicular to this plane.

13. The method as claimed in claim 1,
    wherein the method furthermore comprises:
    before combining the intensity images: applying an operator to the captured intensity images by means of the computing unit, for the purposes of adapting the intensity images.

14. The method as claimed in claim 13,
    wherein the operator is selected from the following group: weighting; amplification; damping; absolute value; squaring; taking a root; reversing the sign; smoothing pixels; aberration correction of pixels; normalizing to a mean value of pixel values of the respective intensity image; and applying a spatial filter.

15. The method as claimed in claim 13,
    wherein the operator is a morphological operator.

16. The method as claimed in claim 13,
    wherein the operator is selected from the following group: normalized local contrast; normalized local intensity; normalized intensity gradient; dilatation; erosion; edge filter; noise filter.

17. The method as claimed in claim 13,
    wherein the operator is a threshold operator.

18. The method as claimed in claim 13,
    wherein a selected operator which adapts a selected intensity image exhibits a dependence on at least one further intensity image.

19. The method as claimed in claim 1,
wherein the method furthermore comprises:
storing image data based on the captured intensity images and associated control data which indicate the respective illumination geometry, in a non-volatile memory,
wherein combining is carried out on the basis of the stored image data and control data in a post-processing step after an image-capturing step, which comprises illuminating the object and capturing the intensity images.

20. An optical apparatus, configured to produce a results image of an object,
wherein the optical apparatus comprises:
an illumination apparatus configured to illuminate the object sequentially using at least two illumination geometries,
a detector configured to capture an intensity image of the object for each one of the at least two illumination geometries during illumination with the respective illumination geometry, and
a computing unit configured to combine the intensity images for the purposes of producing the results image,
wherein the computing unit is configured to combine the intensity images in such a way that the results image satisfies a predetermined numerical optimization criterion, and
further wherein the computing unit is configured to carry out the combining with a spatial resolution for various regions of the intensity images such that the various regions of the results image satisfy the predetermined numerical optimization criterion.

\* \* \* \* \*